(12) United States Patent
Sasaki et al.

(10) Patent No.: US 6,889,516 B2
(45) Date of Patent: May 10, 2005

(54) COOLING SYSTEM FOR MOTOR AND COOLING CONTROL METHOD

(75) Inventors: Kaname Sasaki, Kashiwa (JP); Hiroaki Doi, Tsuchiura (JP); Haruki Hamada, Naka (JP); Masaaki Hayashi, Hitachinaka (JP); Ryuichi Saito, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/625,640

(22) Filed: Jul. 24, 2003

(65) Prior Publication Data
US 2004/0194497 A1 Oct. 7, 2004

(30) Foreign Application Priority Data
Apr. 3, 2003 (JP) ........................................ 2003-100085

(51) Int. Cl.⁷ .............................................. F25D 23/12
(52) U.S. Cl. .................... 62/259.2; 62/228.5; 62/230
(58) Field of Search .............................. 62/259.2, 228.5, 62/230, 243, 244, 236

(56) References Cited

U.S. PATENT DOCUMENTS

| 6,511,295 B2 * | 1/2003 | Suitou et al. ............... 417/44.1 |
| 6,523,361 B2 * | 2/2003 | Higashiyama ............. 62/228.4 |
| 2002/0073726 A1 * | 6/2002 | Hasebe et al. ............. 62/323.1 |
| 2003/0230101 A1 * | 12/2003 | Iritani et al. ............... 62/228.3 |

* cited by examiner

Primary Examiner—Marc Norman
(74) Attorney, Agent, or Firm—Antonelli, Terry, Stout & Kraus, LLP

(57) ABSTRACT

A cooling system for a motor is prevented from exhibiting a thermal fatigue failure due to a temperature cycle. The operation or stopping of the cooling motor fan 6 of the forced cooling system is controlled using the difference between the temperature thereof and the operation start temperature Tis of the power converter 3. Thus expansion of the temperature range is suppressed.

12 Claims, 5 Drawing Sheets

Tis : POWER CONVERTER OPERATION START TEMPERATURE
Tiα : FORCIBLE COOLING START TEMPERATURE RISE AMOUNT
Tiβ : FORCIBLE COOLING STOP TEMPERATURE RISE AMOUNT

| Tis [°C] | Tiα [°C] | Tiβ [°C] |
|---|---|---|
| -20 | 70 | 47 |
| -10 | 65 | 44 |
| 0 | 60 | 41 |
| +10 | 55 | 38 |
| +20 | 50 | 35 |
| +30 | 45 | 32 |
| +40 | 40 | 29 |

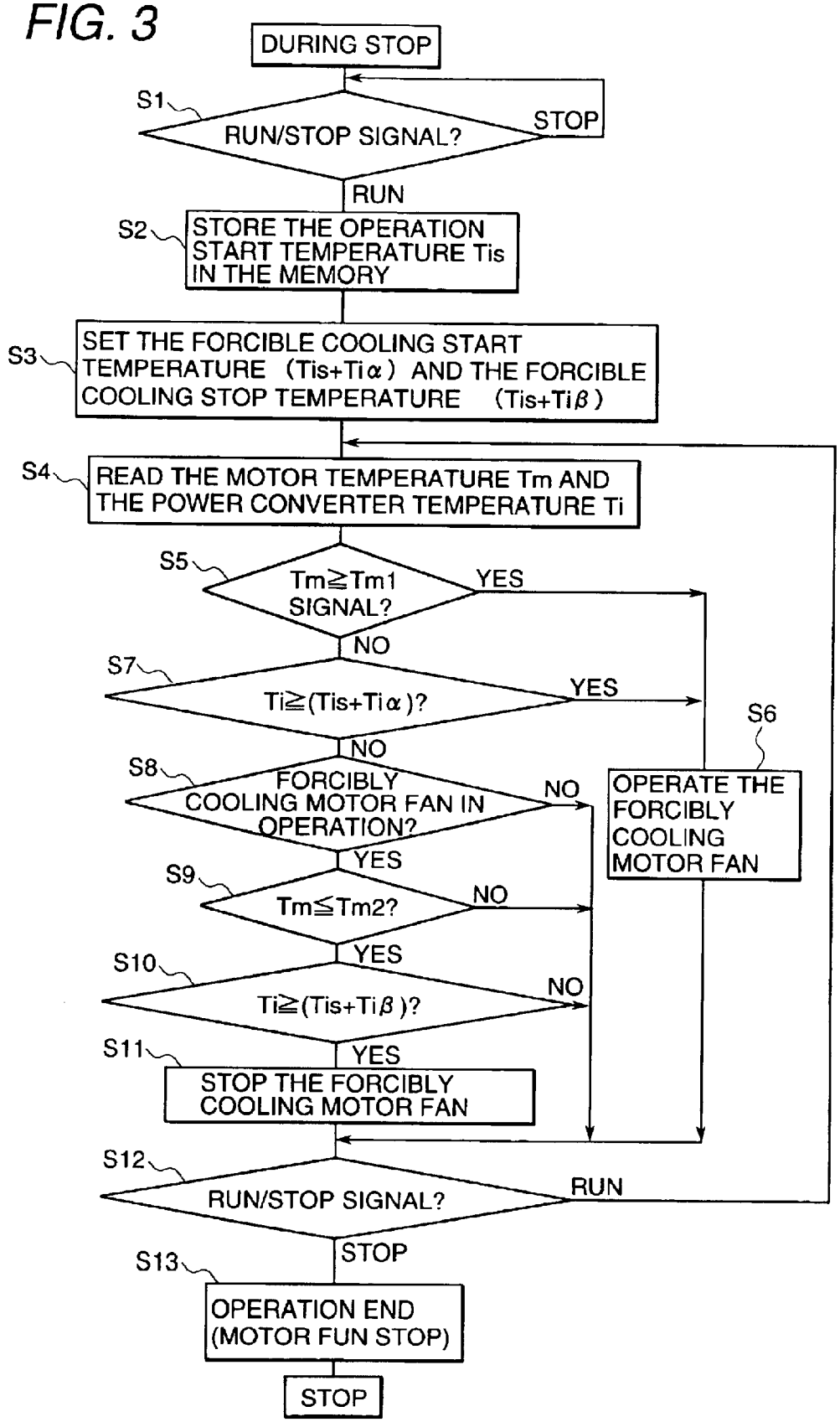

COOLING SYSTEM FOR MOTOR AND COOLING CONTROL METHOD

BACKGROUND OF THE INVENTION

The present invention relates to a cooling system for a motor and to a cooling control method.

An electric vehicle, including a hybrid vehicle, has a system in which power is supplied to a driving motor from a battery via a power converter, and a forced cooling means is provided for suppressing a temperature rise of the power converter and driving motor due to heat generated in correspondence with the operations of the power converter and driving motor.

The forced cooling means is structured so as to force feed a refrigerant, such as fresh air or a cooling liquid (an antifreezing solution), to the power converter and driving motor when the temperatures of the power converter and driving motor rise up to a predetermined cooling start temperature, thereby force cooling them.

For example, a patent document 1 (Japanese Application Patent Laid-open Publication No. Hei 07-213091) and a patent document 2 (Japanese Application Patent Laid-open Publication No. Hei 08-33104) disclose a cooling device for controlling the cooling air speed according to the temperature of heat radiating fins of a semiconductor element of a power converter, which is used for controlling an electric vehicle motor.

Further, a patent document 3 (Japanese Application Patent Laid-open Publication No. Hei 10-210790) discloses an inverter cooling device for an electric vehicle for detecting the temperature of a semiconductor element of an which is used for supplying a current to a motor and for controlling the flow rate of a refrigerant according to the temperature of the semiconductor element and the change rate thereof.

Further, a patent document 4 (Japanese Application Patent Laid-open Announcement Publication No. 2001-527612) discloses a cooling device for detecting the temperatures of a temperature control fluid and ambient air so as to control the temperature of the engine oil of a vehicle at a proper temperature.

For a driving motor of a driving device for an electric vehicle, a DC commutator motor or an inverter driving type DC non-commutator motor is generally used, and the power supply to such a driving motor is controlled by a power converter, such as a chopper circuit or an inverter circuit. During the operation (power supply control), in the driving motor, a loss due to the flow of a current through a coil or a mechanical loss during high-speed rotation is caused; and, also, in the power converter, a loss is caused during power supply to a semiconductor element for power conversion control or at the time of switching. These losses are finally converted to heat, and the total amount of heat reaches several kW at the maximum.

Such generation of heat causes a temperature rise of the driving motor and power converter; and, when it is left as it is, the driving motor and power converter cannot exhibit a predetermined performance due to the temperature rise. Furthermore, the insulating material is reduced in withstand voltage and is finally destroyed, so that the generated heat must be removed.

As a forced cooling means, which effectively radiates a large amount of generated heat and which can be mounted in a limited space, it is common to use a method which employs a forced flow of a refrigerant, using a device such as a pump or a fan, and which causes heat to be radiated by heat exchange between a device generating heat and the refrigerant.

The forced cooling control using a pump or a fan is structured so as to detect the temperatures of the driving motor and power converter, compare them with a cooling start temperature which is set fixedly, and start the operation of the pump or fan when the detected temperatures reach the set cooling start temperature.

Under this forced cooling control method, the cooling start temperature is fixed, so that in winter, when the air temperature is low, the difference between the temperature at the time of operation start of a driving device for an electric vehicle and the maximum temperature during operation is large.

In the power converter, when a temperature cycle is added to the semiconductor element for power conversion control that is used for power conversion, thermal stress caused by the difference in the linear expansion coefficient between the members is generated, and a thermal fatigue failure is generated. Therefore, to avoid generation of a failure due to thermal stress, it is desirable to avoid an excessive temperature difference in the temperature cycle. Moreover, it is required to force cool the semiconductor element for power conversion control so as to maintain it within the heat resistance allowable temperature range before high-temperature failure occurs, or limit the amount of heat.

Further, in the driving motor, since the dielectric strength of the electrical parts and the magnetic characteristics of magnetic parts are reduced in correspondence with the temperature rise, it is desirable to cool these parts so as to prevent the temperature of each of them from exceeding the heat resistance allowable temperature or limit the amount of heat.

Furthermore, when a device such as a pump or a fan is operated, energy consumption follows, so that when such a device is activated often, the energy consumption is increased and the energy consumption rate of the vehicle gets worse.

This is a problem common to not only a cooling system for a driving device for an electric vehicle, but also for various motors using a driving motor.

SUMMARY OF THE INVENTION

An object of the present invention is to provide a cooling system for a motor and a cooling control method which is able to prevent a thermal stress failure due to the temperature cycle of a power converter for controlling the power supply to a driving motor.

Another object of the present invention is to provide a cooling system for a motor and a cooling control method which is able to prevent a thermal stress failure due to the temperature cycle of a power converter, and to maintain a driving motor and the power converter within a desired heat resistance allowable temperature range.

Still another object of the present invention is to provide a cooling system for a motor and a cooling control method which is able to prevent a thermal stress failure due to the temperature cycle of a power converter, to maintain a driving motor and the power converter within a desired heat resistance allowable temperature range, and to reduce the energy consumption for forced cooling.

The present invention provides a cooling system for a motor comprising a driving motor, a power converter for controlling the driving motor, and a cooling means for effecting forced cooling of the driving motor and power converter, wherein: the cooling means has a refrigerant feeding means, a motor temperature detection means for detecting the temperature of the driving motor and for outputting a motor temperature detection signal, a power converter temperature detection means for detecting the temperature of the power converter and outputting it as a power converter temperature detection signal, and a forced cooling control means for referring to the motor temperature detection signal and power converter temperature detection signal and for controlling the refrigerant feeding means and the forced cooling control means has a motor forced cooling control temperature storage means for storing the motor forced cooling control temperature for starting or stopping forced cooling for the driving motor, a power converter operation start temperature storage means for storing the temperature of the power converter at the time of the start of operation as a power converter operation start temperature, and a power converter forced cooling control temperature rise amount storage means for setting and storing the temperatures for starting and stopping forced cooling for the power converter as a forced cooling control temperature rise amount by the temperature rise amount from the power converter operation start temperature and refers to the power temperature detection signal and power converter temperature detection signal and when the motor temperature detection signal rises up to the motor forced cooling control temperature or the temperature rise amount of the power converter temperature detection signal from the power converter operation start temperature reaches the rise amount of the forced cooling control temperature, starts control of the operation of the refrigerant feeding means.

And, the amount of rise in the forced cooling control temperature includes the forced cooling start temperature and forced cooling stop temperature and the difference between the forced cooling start temperature and the forced cooling stop temperature is fixed.

Further, the forced cooling control means changes the amount of rise of the forced cooling control temperature according to the power converter operation start temperature.

Further, the amount of rise in the forced cooling control temperature according to the power converter operation start temperature decreases as the power converter operation start temperature rises.

Further, the forced cooling start temperature and forced cooling stop temperature components in the amount of rise in the forced cooling control temperature decreasing as the power converter operation start temperature rises will reduce the amount of change in the forced cooling stop temperature for the forced cooling start temperature.

Further, the forced cooling control means obtains the temperature rise amount from the power converter operation start temperature when the operation is restarted within a short stop period after ending of the operation as a temperature rise from the power converter operation start temperature at the time of preceding operation start.

Further, the refrigerant feeding means has a refrigerant circulation system for circulating a liquid refrigerant by connecting the driving motor, power converter, radiator with a motor fan, and pump in series and the forcible cooling control means has a fresh air temperature detection means for detecting the fresh air temperature and outputting a fresh air temperature detection signal and controls the motor fan according to the temperature difference between the fresh air and the liquid refrigerant.

Further, the forcible cooling control means, when the fresh air temperature or the liquid refrigerant temperature at the time of operation start of the motor is not higher than the solidifying temperature of the liquid refrigerant, sets the power converter operation start temperature to the solidifying temperature of the liquid refrigerant.

Further, the power converter, when the temperature of the driving motor or the power converter approaches the heat resistance allowable temperature, reduces the conversion output power.

Further, the power converter temperature detection means is built in the chip of semiconductor switching element constituting the power converter.

Further, the present invention provides a cooling system for a motor comprising a driving motor, a power converter for controlling the driving motor, and a cooling means for forced cooling the driving motor and power converter, wherein: the cooling means has a refrigerant feeding means, a motor temperature detection means for detecting the temperature of the driving motor and outputting a motor temperature detection signal, a power converter temperature detection means for detecting the temperature of the power converter and outputting it as a power converter temperature detection signal, and a forcible cooling control means for referring to the motor temperature detection signal and power converter temperature detection signal and controlling the refrigerant feeding means and the forcible cooling control means has a fresh air temperature detection means for detecting the fresh air temperature and outputting a fresh air temperature detection signal, and refers to the motor temperature detection signal, power converter temperature detection signal, and fresh air temperature detection signal, thereby controls the refrigerant feeding means.

Further, the present invention provides a cooling control method for a motor comprising a driving motor, a power converter for controlling the driving motor, and a cooling means for forced cooling the driving motor and power converter, wherein: the cooling means has a refrigerant feeding means, a motor temperature detection means for detecting the temperature of the driving motor and outputting a motor temperature detection signal, a power converter temperature detection means for detecting the temperature of the power converter and outputting it as a power converter temperature detection signal, and a forcible cooling control means for referring to the motor temperature detection signal and power converter temperature detection signal and controlling the refrigerant feeding means and the forcible cooling control means stores the motor forcible cooling control temperatures for starting and stopping forcible cooling for the driving motor, the temperature of the power converter at the time of operation start as a power converter operation start temperature, and the forcible cooling control temperature rise amount set by the temperature rise amount from the power converter operation start temperature as a temperature for starting or stopping forcible cooling for the power converter and refers to the power temperature detection signal and power converter temperature detection signal and when the motor temperature detection signal rises up to the motor forcible cooling control temperature or the temperature rise amount of the power converter temperature detection signal from the power converter operation start temperature reaches the rise amount of the forcible cooling control temperature, starts control of the operation of the refrigerant feeding means.

BRIEF DESCRIPTION OF THE DRAWINGS

FIG. 3 is a flow chart of the forced cooling control process employed by the first embodiment;

DETAILED DESCRIPTION OF THE INVENTION

Various embodiments of the present invention will be explained with reference to FIGS. 1 to 6. Further, common or equivalent constituent parts in the respective embodiments are given the same numerals, and a duplicated explanation thereof will be omitted.

Figure 1:
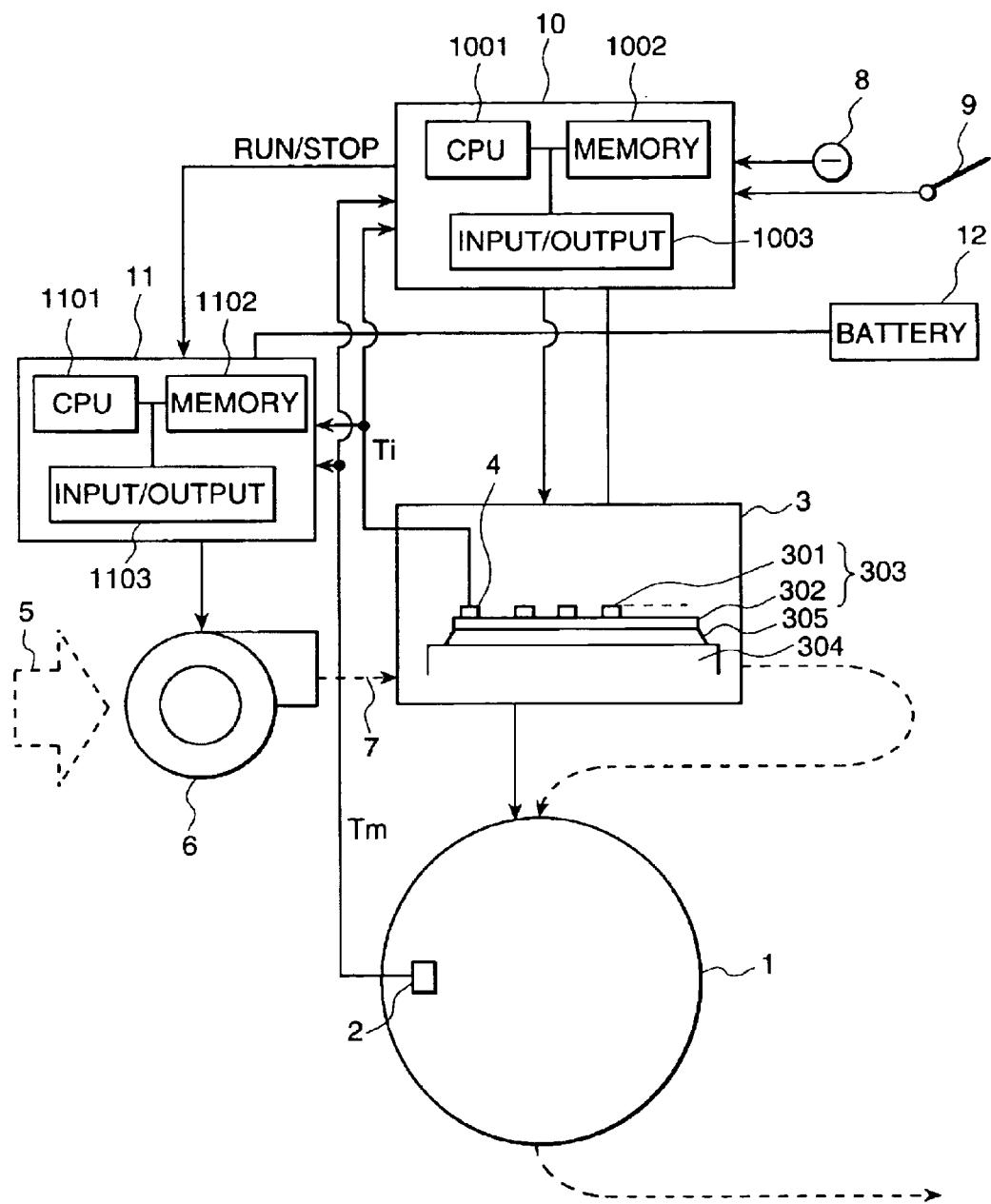
FIG. 1 is a block diagram of the cooling system for the driving device of an electric vehicle according to a first embodiment of the present invention.
Figures 2, 4:
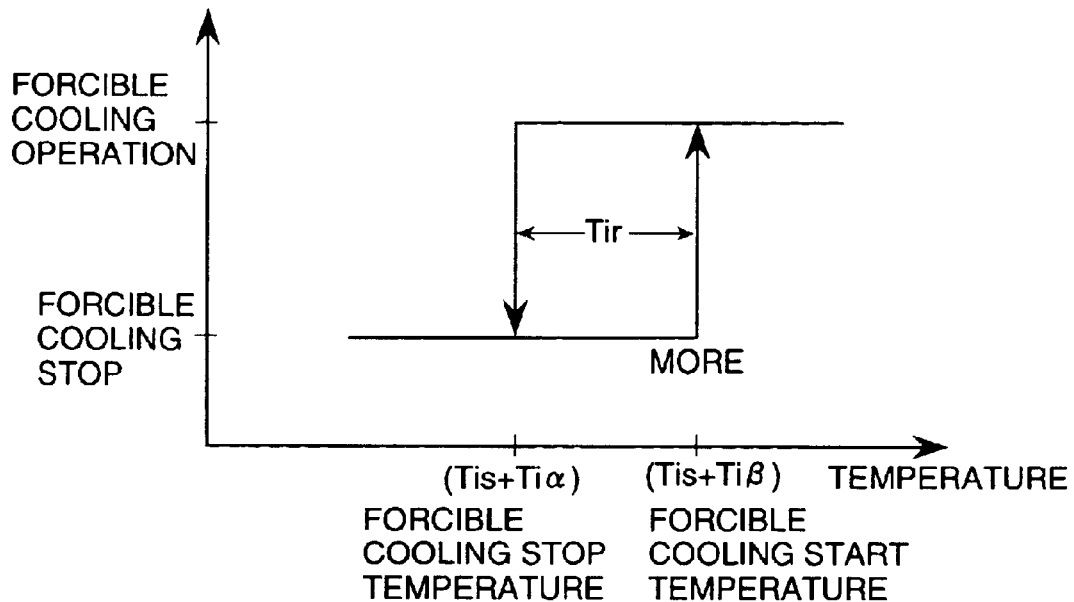
FIG. 2 is a cooling characteristic diagram relating to the first embodiment.
FIG. 4 is a cooling control information table relating to a second embodiment of the present invention.

The first embodiment of the present invention will be explained with reference to FIGS. 1 and 2. FIG. 1 is a block diagram of the cooling system for the driving device of an electric vehicle according to a first embodiment; FIG. 2 is a cooling characteristic diagram thereof; and FIG. 3 is a flow chart of the forced cooling control process.

The first embodiment basically is directed to forced cooling of the power converter, in which the temperature of the power converter, at the time of start of operation of an electric vehicle (when the key switch is turned on or the power converter starts operation), is stored as a power converter operation start temperature, the amount of the temperature rise of the power converter from the power converter operation start temperature is monitored, and forced cooling control of the power converter is started. For cooling the driving motor, the temperature of the driving motor is monitored, and, when the temperature rises up to a cooling start temperature that has been set on the basis of the heat resistance allowable temperature of the driving motor, the forced cooling control of the motor is started. Further, the first embodiment has a feature such that, even under such forced cooling control, when the temperature of the driving motor or the power converter approaches the heat resistance allowable temperature thereof, the conversion output power is reduced.

The constitution of the cooling system for the driving device of an electric vehicle will be explained with reference to FIG. 1. The cooling system for the driving device of an electric vehicle has a driving motor 1, such as an inverter driving brushless motor or a commutator motor for generating the running power of an electric vehicle; a motor temperature detection sensor 2, which operates as a motor temperature detection means for detecting the temperature of the driving motor 1 and for outputting a motor temperature detection signal; a power converter 3, such as an inverter or a chopper for controlling the conversion output power for operating the driving motor 1; a power converter temperature detection sensor 4, which operates as a power converter temperature detection means for detecting the temperature of the power converter 3 and for outputting a power converter temperature detection signal; a forced air cooling fan 6 for taking in fresh air 5 and sending it as a forced cooling refrigerant; a forced cooling refrigerant flow path 7 for transferring the forced cooling refrigerant from the forced cooling fan 6 to the power converter 2 and the driving motor 1; a main control unit 10, which is responsive to an instruction signal output from a key switch 8 or an acceleropedal 9, a motor temperature detection signal output from the motor temperature detection sensor 2, or a power converter temperature detection signal output from the power converter temperature detection sensor 4, for controlling the power converter 3 and outputting a run-stop signal to a forced cooling control unit which will be described later, a forced cooling control unit 11, which is responsive to the motor temperature detection signal output from the motor temperature detection sensor 2, the power converter temperature detection signal output from the power converter temperature detection sensor 4, and the run-stop signal output from the main control unit 10, for controlling the operation of the forced cooling motor fan 6; and a battery 12 for supplying DC power to the system.

The power converter 3, although a detailed diagrammatic illustration thereof is omitted, has a structure which includes a power control electronic circuit unit 303, that is composed of an inverter or a chopper, formed on an insulating substrate 302 made of aluminum nitride, in the form of a semiconductor switching element 301, such as an IGBT, and it is joined to a cooling substrate 304 made of copper or aluminum, which is exposed to a refrigerant and radiates heat, by soldering layer 305. The power control electronic circuit unit 303 operates so as to control the conversion output power supplied to the driving motor 1 from the battery 12 on the basis of a control signal received from the main control unit 10. And, heat generated in the power control electronic circuit unit 303 in correspondence with the power conversion-supply control operation is radiated to a refrigerant flowing through the forced cooling refrigerant flow path 7 via the soldering layer 305 and the cooling substrate 304. The power converter temperature detection sensor 4 is attached onto the insulating substrate 302, so as to be sensitive to the temperature of the insulating substrate 302.

The main control unit 10, although a detailed diagrammatic illustration thereof is omitted, mainly consists of a microcomputer composed of a CPU 1001, a memory 1002, and an input-output circuit 1003. The memory 1002 stores beforehand an operation control program and control information for reducing the conversion output power in order to reduce the amount of heat so as to maintain the driving motor 1 and the power converter 3 within the heat resistance allowable range or to reduce it to zero (for example, the temperature of about 90% of the heat resistance allowable temperature is set as a conversion output power reduction start temperature and the heat resistance allowable temperature is set as a conversion output stop temperature).

The CPU 1001 has an operation control function for executing the operation control program stored in the memory 1002 when the key switch 8 is turned on (a run instruction), thereby entering the operation control state, switching the run-stop signal to be output to the forced cooling control unit 11 to "Run", and controlling the power converter 3, on the basis of a speed instruction signal, according to the amount of actuation of the acceleropedal 9, so as to supply the conversion output power according to the speed instruction signal to the driving motor 1. Then, it monitors the motor temperature detection signal output from the motor temperature detection sensor 2 and the power converter temperature detection signal output from the power converter temperature detection sensor 4, reduces the conversion output power in order to reduce the amount of heat, so as to maintain the driving motor 1 and the power converter 3 within the desired heat resistance temperature range, and controls the power converter 3 so as to reduce the conversion output power to zero as the speed instruction signal becomes zero when the acceleropedal is released. Further, it operates to switch the run-stop signal to be output to the forcible cooling control unit 11 to "Stop", when the key switch 8 is turned off (a stop instruction), thereby putting the cooling system into the operation control end (stop) state.

The forcible cooling control unit 11, although a detailed diagrammatic illustration thereof is omitted, mainly consists of a microcomputer composed of a CPU 1101, a memory 1102, and an input-output circuit 1103. The memory 1102 stores beforehand the cooling control program and, as control information, motor cooling control temperatures Tm1 and Tm2 for starting or stopping forced cooling of the driving motor 1 and cooling control temperature rise amounts Tiα and Tiβ that represent the temperature for starting or stopping forced cooling of the power converter 3 as set by the amount of temperature rise from the power converter operation start temperature Tis.

In consideration of the fact that the motor cooling control temperatures Tm1 and Tm2 for forced cooling of the driving motor 1 prevent the dielectric strength of the electrical parts constituting the driving motor 1 and the magnetic characteristics of the magnetic parts from being reduced in correspondence with a temperature rise and reduce the cooling consumption power (energy consumption) by operating the forced cooling motor fan 6, the cooling start temperature Tm1 for starting forced cooling and the cooling stop temperature Tm2 for stopping forced cooling are set. For example, the cooling start temperature Tm1 is set to 90° C. and the cooling stop temperature Tm2 is set to 70° C.

The cooling control temperature rise amounts Tiα and Tiβ for forced cooling of the power converter 3 are the cooling start temperature rise amount Tiα for starting forced cooling and the cooling stop temperature rise amount Tiβ for stopping forced cooling, and they are temperature rise amounts mainly set in consideration of the need to prevent failure of the soldering layer 305, which fastens the power control electronic circuit unit 303 to the cooling substrate 304, due to thermal stress by the temperature cycle of the power converter 3, and the forced cooling consumption power (energy consumption) is reduced by operating the forced cooling motor fan 6. As shown in FIG. 2, the cooling start temperature rise amounts Tiα is set by the temperature rise amount from the power converter operation start temperature Tiβ, and the cooling stop temperature rise amount Tiβ is set by the temperature rise amount from the power converter operation start temperature Tis. For example, the cooling start temperature rise amount Tiα is set to 50° C. and the cooling stop temperature rise amount Tiβ is set 35° C. The difference Tiγ between the cooling start temperature rise amounts Tiα and the cooling stop temperature rise amount Tiβ is fixed (here 15° C.), so that the cooling stop temperature rise amount Tiβ may be set by the lowering amount (=difference Tiγ) from the cooling start temperature rise amounts Tiα.

The CPU 1101 executes the forced cooling control program when the run-stop signal output from the main control unit 10 is switched to "Run" and stores the power converter temperature detection signal (Ti) output from the power converter temperature detection sensor 4 in the memory 1102 as a power converter operation start temperature Tis. Thereafter, the CPU 1101 reads the motor temperature detection signal (Tm) output from the motor temperature detection sensor 2 and the power converter temperature detection signal (Ti) output from the power converter temperature detection sensor 4 whenever necessary and executes the forced cooling control.

The CPU 1101, under forced cooling control for forced cooling of the driving motor 1, monitors the motor temperature detection signal (Tm) output from the motor temperature detection sensor 2. When the motor temperature Tm rises up to or becomes higher than the motor cooling start temperature Tm1 for starting forced cooling of the driving motor 1, the forced cooling fan 6 is operated, fresh air 5 is taken in, and the fresh air is sent to the forced cooling refrigerant flow path 7 as a forced cooling refrigerant, so that forced cooling of the driving motor 1 and the power converter 3 takes place. And, by this cooling, when the temperature Tm of the driving motor 1 lowers down to or becomes lower than the motor cooling stop temperature Tm2, the CPU 1101 stops the operation of the forced cooling fan 6; so as to stop the forced cooling.

Further, under forced cooling control for the power converter 3, when the temperature Ti of the power converter 3 rises up to or becomes higher than the power converter cooling start temperature (Tis+Tiα), for which the cooling start temperature rise amount Tiα is added to the power converter operation start temperature Tis, the CPU 1101 operates the forced cooling fan 6, takes in fresh air 5, and sends it to the forced cooling refrigerant flow path 7 as a forced cooling refrigerant, thereby to force cool the driving motor 1 and the power converter 3. By this forced cooling, when the temperature Tiβ of the power converter 3 lowers down to or becomes lower than the power converter cooling stop temperature (Tis+Tiβ), for which the cooling stop temperature rise amount Tis is added to the power converter operation start temperature Tis, the CPU 1101 stops the operation of the forced cooling fan 6, so as to stop the forced cooling.

The forced cooling of the driving motor 1 and the forced cooling of the power converter 3 are carried out by sharing the use of the forced cooling motor fan 6, so that when the forced cooling of either the driving motor 1 or the power converter 3 is necessary, the CPU 1101 operates the forced cooling motor fan 6 so as to send the forced cooling refrigerant to the forced cooling refrigerant flow path 7.

An example of the control process executed by the CPU 1101 of the forced cooling control unit 11 will be explained with reference to the control process flow chart shown in FIG. 3.

Step S1:

The CPU 1101 monitors the run-stop signal output from the main control unit 10, and, when the signal is switched to "Run", the process goes to Step S2.

Step S2:

When the run-stop signal is switched to "Run", the CPU 1101 reads the power converter temperature detection signal output from the power converter temperature detection sensor 4, stores the power converter temperature Ti in the memory 1102 as a power converter operation start temperature Tis, and the process goes to Step S3.

Step S3:

The CPU 1101 obtains the power converter cooling start temperature (Tis+Tiα), for which the cooling start temperature rise amount Tiα is added to the power converter operation start temperature Tis, and the power converter cooling stop temperature (Tis+Tiβ), for which the cooling stop temperature rise amount Tiβ is added to the power converter operation start temperature Tis, stores (sets) them in the memory 1102, and the process goes to Step S4.

Step S4:

The CPU 1101 reads the motor temperature detection signal (Tm) and the power converter temperature detection signal (Ti), detects the motor temperature Tm and the power converter temperature Ti, and the process goes to Step S5.

Step S5:

The CPU 1101 compares the detected motor temperature Tm with the motor cooling start temperature Tm1 stored in the memory 1102 and branches the process. When the motor temperature Tm is not lower than the motor cooling start temperature Tm1, the CPU 1101 goes to Step S6, and, when the motor temperature Tm is lower than the motor cooling start temperature Tm1, the CPU 1101 goes to Step S7.

Step S6:

The CPU 1101 puts the forced cooling motor fan 6 into the operation (rotation) state, and the process goes to Step S12.

Step S7:

The CPU 1101 compares the detected power converter temperature Ti with the power converter cooling start temperature (Tis+Tiα) stored in the memory 1102 and branches the process. When the power converter temperature Ti is not lower than the power converter cooling start temperature (Tis+Tiα), the CPU 1101 goes to Step S6, and, when the power converter temperature Ti is lower than the power converter cooling start temperature (Tis+Tiα), the CPU 1101 goes to Step S8.

Step S8:

The CPU 1101 confirms whether the forced cooling motor fan 6 is in op ration or not, and when it is in operation, the process goes to Step S9, otherwise it goes to Step S12.

Step S9:

The CPU 1101 compares the detected motor temperature Tm with the motor cooling stop temperature Tm2 stored in the memory 1102; and, when the motor temperature Tm is higher than the motor cooling stop temperature Tm2, the process goes to Step S12, while, when the motor temperature Tm is not higher than the motor forcible cooling stop temperature Tm2, the process goes to Step S10.

Step S10:

The CPU 1101 compares the detected power converter temperature Ti with the power converter cooling stop temperature (Tis+Tiβ) stored in the memory 1102; and, when the power converter temperature Ti is higher than the power converter cooling stop temperature (Tis+Tiβ), the process goes to Step S12, while, when the power converter temperature Ti is not higher than the power converter cooling stop temperature (Tis+Tiβ), the CPU 1101 goes to Step S11.

Step 11:

The CPU 1101 puts the forced cooling motor fan 6 into the rotation stop state, and the process goes to Step S12.

Step 12:

The CPU 1101 confirms the run-stop signal output from the main control unit 10 and branches the process. When the run-stop signal is switched to "Run", the CPU 1101 goes to Step S4, and, when it is switched to "Stop", it goes to Step S13.

Step S13:

The CPU 1101 executes the operation end process of putting the forced cooling motor fan 6 into the stop state, and process is concluded.

According to this forced cooling control, the cooling of the power converter 3 is controlled on the basis of the amount of temperature rise from the power converter operation start temperature, which is set in consideration of the fact that the power converter 3 is prevented from failure by thermal stress due to the temperature cycle and the forced cooling power consumption is reduced by operating the forced cooling motor fan 6, so that the temperature difference is small even in winter when the temperature at the time of operation start is low and the temperature cycle can be kept constant through all seasons. Thus thermal stress can be prevented from excessively increasing, and the forced cooling power consumption is reduced. Further, the cooling of the driving motor 1 is controlled on the basis of the cooling control temperature set in consideration of the fact that the dielectric strength of the electrical parts constituting the driving motor 1 and the magnetic characteristics of the magnetic parts are prevented from being reduced in correspondence with a temperature rise, and the forced cooling consumption power is reduced by operating the forced cooling motor fan 6, so that the performance and life of the driving motor 1 are prevented from degradation, and the forcible cooling power consumption is reduced.

In this embodiment, as a forced cooling refrigerant, fresh air 5 is used. However, the present invention is not limited thereto.

Further, for forced cooling control, two stages of control of the "forced cooling operation" and "stop" are illustrated. However, it may be changed to multi-stage control in which the forced cooling force (the rotational speed of the forced cooling fan 6) is changed according to the temperature.

A second embodiment of the present invention will be explained with reference to FIGS. 1 to 4. FIG. 4 shows a forced cooling control information table relating to the second embodiment.

The second embodiment has a feature in which the cooling start temperature rise amount Tiα for starting forced cooling, which is a forcible cooling control temperature rise amount in forcible cooling for the power converter 3, and the forcible cooling stop temperature rise amount Tis for stopping forced cooling in the forcible cooling control characteristics shown in FIG. 2 in the first embodiment mentioned above, are set by variables changing according to the power converter operation start temperature Tis. More specifically, when the power converter operation start temperature Tis rises, the cooling start temperature rise amount Tiα and the cooling stop temperature rise amount Tis are reduced. The amount of the reduction of the cooling stop temperature rise amount Tis due to rising of the power converter operation start temperature Tiβ is smaller than the amount of reduction of the cooling start temperature rise amount Tiα. FIG. 4 illustrates the cooling start temperature rise amount Tiα and the forcible cooling stop temperature rise amount Tis for this power converter operation start temperature Tiβ.

When forced cooling control for a cooling system for a driving device of an electric vehicle, structured according to the block diagram shown in FIG. 1 is executed on the basis of such control information, although the thermal stress acting on the power converter 3 increases, the operation of the cooling motor fan 6 at low temperature is suppressed, so that the power consumption for cooling can be reduced.

More specifically, in the control provided in the second embodiment, a process is added to obtain and set the power converter cooling start temperature (Tis+Tiα) and the power converter cooling stop temperature (Tis+Tiβ) at Step S3, in which the CPU 1101 of the cooling control unit 11 selects the cooling start temperature rise amount Tiα and the cooling stop temperature rise amount Tiβ to be added to the power converter operation start temperature Tis according to the power converter operation start temperature Tis.

Figure 5:
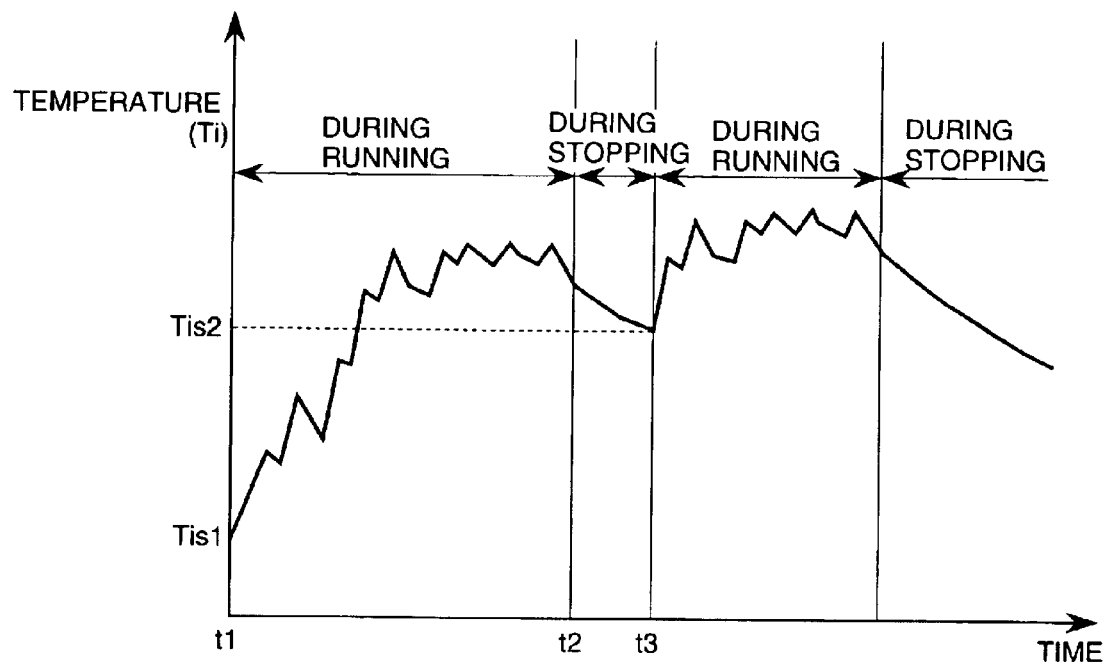
FIG. 5 is a temperature characteristic diagram showing changes with time of the temperature of the power converter in a third embodiment of the present invention.

A third embodiment of the present invention will be explained with reference to FIGS. 1 to 5. FIG. 5 is a temperature characteristic diagram showing changes with time of the temperature of the power converter of the third embodiment.

During the stop period, after the end of operation, the temperatures of the driving motor 1 and the power converter 3 slowly lower due to natural cooling. Therefore, when the operation is restarted within a short period after the end of operation, the temperatures of the driving motor 1 and the power converter 3 are considerably higher than the environmental temperature, and thermal stress remains in the power converter 3. The thermal stress of the power converter 3 in correspondence with a temperature rise due to restart of the operation in such a state is desirably considered to be caused by the temperature rise from the power converter operation start temperature at the time of a preceding operation start, which is an operation start after a long stop period, causing a disappearing of the thermal stress.

The third embodiment, in consideration of such residual thermal stress of the power converter 3, as the aforementioned power converter operation start temperature Tis in the first embodiment, adopts the power converter operation start temperature at the time of a preceding operation start, which is an operation start after a long stop period, causing the disappearing of thermal stress, when the operation is restarted within a short stop period after the end of operation.

More specifically, as shown in FIG. 5, when the operation is started by turning on the key switch 8 at the time t1, after the electric vehicle has been stopped for many hours and the temperature Ti of the power converter 3 approaches the environmental temperature, the power converter operation start temperature at that time is Tis1; and, thereafter, by repetitive running and stopping of the electric vehicle, the temperatures Tm and Ti of the driving motor 1 and the power converter 3 rise and lower repeatedly. When the temperature Tm or Ti of the driving motor 1 or the power converter 3 reaches the motor cooling start temperature Tm1 or the power converter cooling start temperature (Tis+Tiα) or higher, the forced cooling motor fan 6 is operated, and forced cooling of the driving motor 1 and the power converter 3 is started. Then, when the temperature Tm or Ti of the driving motor 1 or the power converter 3 reaches the motor cooling stop temperature Tm2 or the power converter cooling stop temperature (Tis+Tiβ) or lower, the forced cooling motor fan 6 is stopped, whereby the forced cooling is stopped.

When the key switch 8 is turned off at the time t2, and the operation is finished, and the system enters the stop state, the temperatures Tm and Ti of the driving motor 1 and the power converter 3 lower due to natural heat radiation.

Thereafter, when the operation is restarted at the time t3, when the temperature Ti of the power converter 3 is higher than the environmental temperature, the power converter operation start temperature at this time is Tis2. In this state, in the power converter 3, the thermal stress due to temperature rise by heat generation at the time of the preceding operation remains, and when the power converter cooling start temperature (Tis+Tiα) and the power converter cooling stop temperature (Tis+Tiβ) are set by adding the cooling start temperature rise amount Tiα and the cooling stop temperature rise amount Tis to the power converter operation start temperature Tis2, there is the possibility that the cooling control temperature for the power converter 3 may become excessively high.

Therefore, the third embodiment is structured so that, in a case of operation restart after such an operation stop for a short time, the temperature of the power converter 3 lowers sufficiently and the power converter operation start temperature Tis1 at the time of the preceding operation start, which is an operation start after a long stop period causing the thermal stress to disappear, is adopted as the power converter operation start temperature Tis for setting the power converter cooling start temperature (Tis+Tiα) and the power converter cooling stop temperature (Tis+Tiα) to be used for forced cooling control of the power converter 3.

To realize this forced cooling control, the CPU 1101 of the forced cooling control unit 11 of the third embodiment has a clock function, and the memory 1102 has an information holding function for storing and holding a desired stop period which has been preset in consideration of the time necessary for sufficient lowering of the temperature of the power converter 3, and for holding the power converter operation start temperature Tis even during stop. And, the CPU 1101, in the operation ending operation at Step S13, performs a process of storing and holding the operation end date and time in the memory 1102. At Step S2, it reads the operation start date and time and obtains the stop period from the previous operation end date and time. When the stop period is longer than the desired stop period, it rewrites and sets the temperature Tis2 of the power converter 3 at that time with the power converter operation start temperature Tis; and, when the stop period is within the desired stop period, it sets the time Tis1 of the power converter 3 at the time of the previous start with the power converter operation start temperature Tis.

The other features are the same as those of the aforementioned embodiments.

According to the third embodiment, as described above, the same forced cooling effect as that of the aforementioned embodiments is obtained; and, even when the operation is restarted after a short-time stop, the temperature difference in the power converter 3 is not large and the temperature cycle can be controlled within a fixed rang, so that a highly reliable driving device for an electric vehicle can be realized.

Figure 6:
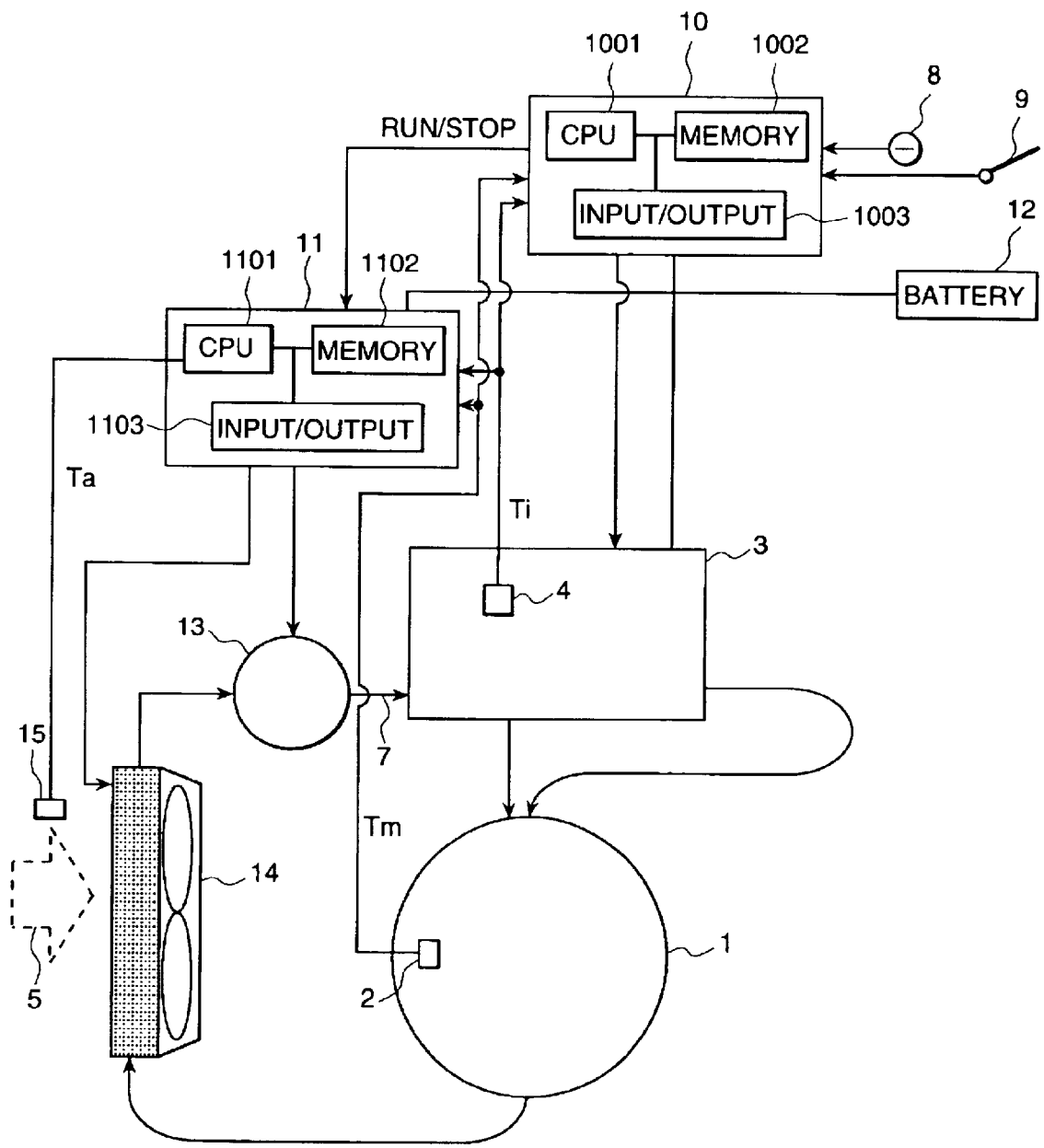
FIG. 6 is a block diagram of the cooling system for the driving device of an electric vehicle representing a fourth embodiment of the present invention.

A fourth embodiment of the present invention will be explained with reference to FIGS. 2 to 6. FIG. 6 is a block diagram of the cooling system of the driving device for an electric vehicle according to the fourth embodiment.

The fourth embodiment has a structure such that the heat of the power converter 3 and the driving motor 1 is carried away by a liquid refrigerant, and the heat of the liquid refrigerant is radiated to fresh air by a radiator cooled with a fan. The heat radiation capacity (operation and stop of the motor fan) of the radiator, that is cooled with a fan by fresh air is, controlled. Namely, in a state in which a liquid refrigerant is circulated and the units are force cooled, when the temperature difference between the liquid refrigerant and the fresh air is large, heat is radiated by natural ventilation because the radiation capacity of the radiator is large; and, when the temperature difference between the liquid refrigerant and fresh air is small, heat radiation is promoted by forced ventilation because the radiation capacity of the radiator is small.

In the fourth embodiment, as a refrigerant circulation system for circulating a refrigerant, a forced cooling refrigerant flow path 7 coming out from a water pump 13, sequentially passing the power converter 3, the driving motor 1, and a radiator 14 with a motor fan for radiating heat to fresh air 5, and returning to the water pump 13 is formed. Further, a fresh air temperature detection sensor 15, which serves as a fresh air temperature detection means for detecting the temperature of fresh air 5 and outputting a fresh air temperature detection signal (Ta) is provided.

The forced cooling control unit 11 controls the water pump 13, in the same way as control of the forced cooling motor fan 6 is effected, when the water pump 13 is operated, whereby a refrigerant is circulated so as to execute forced cooling. For this purpose, the forced cooling control unit 11 refers to the fresh air temperature detection signal (Ta) output from the fresh air detection sensor 15, when the temperature difference Ta–f between the fresh air temperature Ta and the liquid refrigerant temperature Tf reaches the preset radiator forcible heat radiation start temperature difference Tw1 or becomes smaller, and it operates the motor fan of the radiator 14 so as to generate forced ventilation. When the temperature difference reaches the radiator forcible heat radiation stop temperature difference Tw2 or becomes larger, it executes the control for stopping the motor fan. The temperature difference Ta–f (the radiator heat radiation start temperature difference Tw1 and the radiator heat radiation stop temperature difference Tw2) is set according to the heat radiation characteristics of the radiator 14 which is cooled with a fan.

The liquid refrigerant temperature Tf is desirably detected by installing a temperature detection sensor in the forced cooling refrigerant flow path 7. However, in the fourth embodiment, there is a relationship in which the liquid refrigerant temperature Tf and the power converter temperature Ti are almost constant, so that the power converter temperature detection signal (Ti) is appropriated. Further, the system may be structured so as to appropriate a motor temperature detection signal (Tm) or to install a temperature detection sensor (not shown in the drawing) in the radiator 14 and appropriate a temperature detection signal output from the temperature detection sensor.

Since the operation of the fan for cooling the radiator 14 is controlled like this, the system is structured so that the forced cooling control unit 11 presets and stores the radiator heat radiation start temperature difference Tw1 and the radiator heat radiation stop temperature difference Tw2 in the memory 1102. The CPU 1101, when the water pump 13 is operated and a refrigerant is circulated so as to execute cooling, refers to a fresh air temperature detection signal output from the fresh air detection sensor 15, detects a fresh air temperature Ta, when the temperature difference Ta–f between the fresh air temperature Ta and the liquid refrigerant temperature Tf reaches a preset radiator heat radiation start temperature Tw1 or becomes higher, operates the motor fan of the radiator 14. When the temperature difference reaches the radiator heat radiation stop temperature Tw2 or becomes lower, the control process of stopping the motor fan is executed.

The other features are the same as those of the aforementioned embodiments.

According to the fourth embodiment, as described above, the same cooling effect as that of the aforementioned embodiments is obtained, and the driving motor 1 and the power converter 3 can be force cooled by a liquid refrigerant having a large heat capacity, so that the cooling efficiency is increased and the system can be made compact. Further, the radiator 14 radiates heat naturally with the fan stopped until the temperature difference reaches the radiator heat radiation start temperature difference Tw1 or larger, so that the power (energy) consumption for operating the fan and for generating forced ventilation can be reduced.

Figure 7:
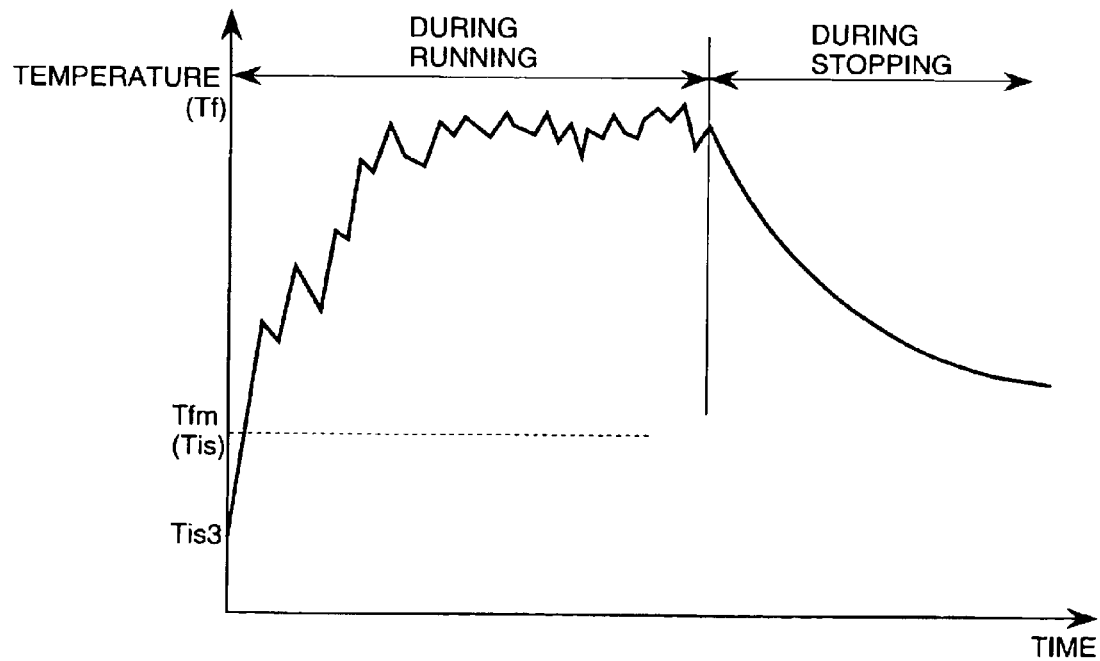
FIG. 7 is a characteristic diagram showing changes with time of the temperature of the liquid refrigerant (the power converter) of the cooling system for the driving device of an electric vehicle in a fifth embodiment of the present invention.

A fifth embodiment of the present invention will be explained with reference to FIGS. 2 to 7. FIG. 7 is a characteristic diagram showing changes with time of the temperature of the liquid refrigerant (the power converter) of the cooling system of the driving device for an electric vehicle according to the fifth embodiment.

For a liquid refrigerant to be used for cooling, a liquid refrigerant is used that has a solidifying temperature lower than an expectable fresh air temperature in an environment in which an electric vehicle is used. However, the fresh air temperature may become lower than the solidifying temperature of the liquid refrigerant due to unexpected cold temperatures. In such a case, the liquid refrigerant will become solidified. However, the liquid refrigerant is heated and melted by heat generated by the driving motor and power converter as the electric vehicle is driven. When the forced cooling control system functions in this state and the water pump and radiator provided with a fan are operated, there is the possibility that the liquid refrigerant may be over-cooled and may re-solidify.

The fifth embodiment is structured so as to prevent such re-solidification of the liquid refrigerant. When the temperature of the liquid refrigerant or fresh air at the time of start of operation of an electric vehicle is not higher than the solidifying temperature of the liquid refrigerant, the liquid refrigerant solidifying temperature is used as a power converter operation start temperature Tis set for forced cooling control.

More specifically, as shown in FIG. 7, under forced cooling control in the state in which the power converter operation start temperature Tis3, corresponding to the temperature of fresh air or the temperature of the liquid refrigerant, is not higher than the solidifying temperature Tfm of the refrigerant flowing in the forced cooling liquid refrigerant flow path 7, the solidifying temperature Tfm is set as a power converter operation start temperature Tis, and the forced cooling control process is executed.

By doing this, the forced cooling system is operated at a considerably higher temperature than the solidifying temperature Tfm of the liquid refrigerant, so that the liquid refrigerant can be prevented from re-solidification, and the power consumption can be reduced.

In the embodiments described above, the control and forced cooling control for the driving motor 1 are structured so as to be executed separately by the main control unit 10 and the forced cooling control unit 11. However, the control and forced cooling control for the driving motor 1 may be structured so as to be executed by one main control unit 10.

The power converter temperature detection sensor 4 of the respective embodiments described above is attached onto the insulating substrate 302 of the power control electronic circuit unit 303 of the power converter 3. However, when a temperature detection sensor is built in the chip of the semiconductor switching element 301, such as an IGBT, the temperature detection sensor built in the chip may be substituted therefor.

Further, the present invention is not limited to the cooling system and cooling control method for the driving device of an electric vehicle, as mentioned above, and can be used as a cooling system and a cooling control method for various motors comprising a driving motor, a power converter for controlling the driving motor, and a cooling means for forced cooling of the driving motor and power converter, wherein the cooling means has a refrigerant feeding means, a motor temperature detection means for detecting the temperature of the driving motor and outputting a motor temperature detection signal, a power converter temperature detection means for detecting the temperature of the power converter and outputting it as a power converter temperature detection signal, and a forced cooling control means responsive to the motor temperature detection signal and power converter temperature detection signal for controlling the refrigerant feeding means.

In the cooling system and cooling control method for a motor according to the present invention, the power converter is force cooled so as to keep the difference between the temperature thereof at the time of the start of operation and the temperature thereof during constant operation, so that the power converter can be prevented from failure due to thermal stress.

Further, the driving motor and power converter can be maintained within the heat resistance allowable temperature range.

Furthermore, due to forced cooling, the energy consumption can be reduced.

What is claimed is:

1. A cooling system for a motor comprising a driving motor, a power converter for controlling said driving motor, and cooling means for forced cooling said driving motor and said power converter, wherein:

said cooling means has refrigerant feeding means, motor temperature detection means for detecting the temperature of said driving motor and outputting a motor temperature detection signal, power converter temperature detection means for detecting the temperature of said power converter and outputting it as a power converter temperature detection signal, and forcible cooling control means for referring to said motor temperature detection signal and said power converter temperature detection signal and controlling said refrigerant feeding means and said forcible cooling control means has motor forcible cooling control temperature storage means for storing said motor forcible cooling control temperature for starting or stopping forcible cooling for said driving motor, power converter operation start temperature storage means for storing the temperature of said power converter at the time of operation start as a power converter operation start temperature, and power converter forcible cooling control temperature rise amount storage means for setting and storing said temperatures for starting and stopping forcible cooling for said power converter as a forcible cooling control temperature rise amount by the temperature rise amount from said power converter operation start temperature and refers to said power temperature detection signal and said power converter temperature detection signal and when said motor temperature detection signal rises up to said motor forcible cooling control temperature or the temperature rise amount of said power converter temperature detection signal from said power converter operation start temperature reaches the rise amount of said forcible cooling control temperature, starts control of the operation of said refrigerant feeding means.

2. A cooling system for a motor according to claim 1, wherein:

said rise amount of forcible cooling control temperature includes said forcible cooling start temperature and said forcible cooling stop temperature and the difference between said forcible cooling start temperature and said forcible cooling stop temperature is fixed.

3. A cooling system for a motor according to claim 1, wherein:

said forcible cooling control means changes said rise amount of forcible cooling control temperature according to said power converter operation start temperature.

4. A cooling system for a motor according to claim 3, wherein:

said rise amount of forcible cooling control temperature according to said power converter operation start temperature decreases as said power converter operation start temperature rises.

5. A cooling system for a motor according to claim 4, wherein:

said forcible cooling start temperature and said forcible cooling stop temperature in said rise amount of forcible cooling control temperature decreasing as said power converter operation start temperature rises reduce the change amount of said forcible cooling stop temperature for said forcible cooling start temperature.

6. A cooling system for a motor according to one of claims 1 to 5, wherein:

said forcible cooling control means obtains a temperature rise amount from said power converter operation start temperature when the operation is restarted within a short stop period after ending of said operation as a temperature rise from said power converter operation start temperature at the time of preceding operation start.

7. A cooling system for a motor according to one of claims 1 to 5, wherein:

said refrigerant feeding means has a refrigerant circulation system for circulating a liquid refrigerant by connecting said driving motor, said power converter, a radiator with a motor fan, and a pump in series and said forcible cooling control means has fresh air temperature detection means for detecting fresh air temperature and outputting a fresh air temperature detection signal and controls said motor fan according to the temperature difference between said fresh air and said liquid refrigerant.

8. A cooling system for a motor according to one of claims 1 to 5 wherein:

said forcible cooling control means, when said fresh air temperature or said liquid refrigerant temperature at the time of operation start of said motor is not higher than the solidifying temperature of said liquid refrigerant, sets said power converter operation start temperature to said solidifying temperature of said liquid refrigerant.

9. A cooling system for a motor according to one of claims 1 to 5 wherein:

said power converter, when the temperature of said driving motor or said power converter approaches the heat resistance allowable temperature, reduces the conversion output power.

10. A cooling system for a motor according to one of claims 1 to 5, wherein:

said power converter temperature detection means is built in a chip of semiconductor switching element constituting said power converter.

11. A cooling system for a motor comprising a driving motor, a power converter for controlling said driving motor, and cooling means for forced cooling said driving motor and said power converter, wherein:

said cooling means has refrigerant feeding means, motor temperature detection means for detecting the temperature of said driving motor and outputting a motor temperature detection signal, power converter temperature detection means for detecting the temperature of said power converter and outputting it as a power converter temperature detection signal, and forcible cooling control means for referring to said motor temperature detection signal and said power converter temperature detection signal and controlling said refrigerant feeding means and said forcible cooling control means has fresh air temperature detection means for detecting the fresh air temperature and outputting a fresh air temperature detection signal, refers to said motor temperature detection signal, said power converter temperature detection signal, and said fresh air temperature detection signal, thereby controls said refrigerant feeding means.

12. A cooling control method for a motor comprising a driving motor, a power converter for controlling said driving motor, and cooling means for forced cooling said driving motor and said power converter, wherein:

said cooling means has refrigerant feeding means, motor temperature detection means for detecting the temperature of said driving motor and outputting a motor temperature detection signal, power converter temperature detection means for detecting the temperature of said power converter and outputting it as a power converter temperature detection signal, and forcible cooling control means for referring to said motor temperature detection signal and said power converter temperature detection signal and controlling said refrigerant feeding means and said forcible cooling control means stores said motor forcible cooling control temperatures for starting and stopping forcible cooling for said driving motor, the temperature of said power converter at the time of operation start as a power converter operation start temperature, and said forcible cooling control temperature rise amount set by said temperature rise amount from said power converter operation start temperature as a temperature for starting or stopping forcible cooling for said power converter and refers to said power temperature detection signal and said power converter temperature detection signal and when said motor temperature detection signal rises up to said motor forcible cooling control temperature or said temperature rise amount of said power converter temperature detection signal from said power converter operation start temperature reaches said rise amount of forcible cooling control temperature, starts control of the operation of said refrigerant feeding means.

* * * * *